(12) United States Patent
Pasadyn et al.

(10) Patent No.: US 7,067,333 B1
(45) Date of Patent: Jun. 27, 2006

(54) METHOD AND APPARATUS FOR IMPLEMENTING COMPETING CONTROL MODELS

(75) Inventors: Alexander J. Pasadyn, Austin, TX (US); Matthew A. Purdy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 429 days.

(21) Appl. No.: 10/186,145

(22) Filed: Jun. 28, 2002

(51) Int. Cl.
*H01L 21/00* (2006.01)
*H01L 21/66* (2006.01)
*H01L 23/58* (2006.01)

(52) U.S. Cl. ............... 438/5; 438/8; 438/9; 438/14; 257/48

(58) Field of Classification Search ............ 438/14–18, 438/5–13; 257/48
See application file for complete search history.

(56) References Cited

U.S. PATENT DOCUMENTS

| | | | |
|---|---|---|---|
| 6,112,058 A * | 8/2000 | Walters et al. | 455/67.11 |
| 6,587,744 B1 * | 7/2003 | Stoddard et al. | 700/121 |
| 6,597,447 B1 * | 7/2003 | Stirton et al. | 356/237.2 |
| 6,703,250 B1 * | 3/2004 | Chiu | 438/9 |
| 6,883,158 B1 * | 4/2005 | Sandstrom et al. | 716/19 |

OTHER PUBLICATIONS

International Sematech "Advanced Process Control Framework Initiative (APCFI) Project: Overview" Tech. Transfer #99053735A-TR. Jun. 30, 1999. <<http://www.sematech.org/docubase/document/3735atr.pdf>>.*

* cited by examiner

*Primary Examiner*—Thanh Nguyen
(74) *Attorney, Agent, or Firm*—Williams Morgan & Amerson

(57) ABSTRACT

A method for controlling a process includes determining incoming state information associated with the process. A plurality of control models associated with the process is provided. A confidence metric is determined for each of the control models based on the incoming state information. The one of the plurality of control models having the highest associated confidence metric is selected. A control action for determining at least one parameter in an operating recipe used to implement the process is generated using the selected control model. A system includes a process tool and a process controller. The process tool is configured to process a workpiece in accordance with an operating recipe. The process controller is configured to determine incoming state information associated with processing the workpiece, determine a confidence metric for each of a plurality of control models based on the incoming state information, select the one of the plurality of control models having the highest associated confidence metric, and generate a control action for determining at least one parameter in the operating recipe using the selected control model.

23 Claims, 3 Drawing Sheets

Figure 2A  Figure 2B

METHOD AND APPARATUS FOR IMPLEMENTING COMPETING CONTROL MODELS

BACKGROUND OF THE INVENTION

1. Field of the Invention

This invention relates generally to the field of semiconductor device manufacturing and, more particularly, to a method and apparatus for implementing competing control models.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, rapid thermal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a process tool being controlled based on feedback or feedforward metrology data collected related to the processing by the process tool. A control model typically includes one or more configurable controller tuning parameters. Exemplary tuning parameters include gain factors that are applied to feedback or feedforward metrology data or weight factors that are applied to current and historical metrology data for data smoothing techniques. Values for the tuning parameters may be calculated or determined empirically. The efficacy of the process controller depends in great part on the optimization of the tuning parameters. For example, an aggressive control model may react quickly to deviations from target, while a more conservative model may react more slowly. The configurable control model parameters define the nature of the control model response.

There are various sources of variation in a semiconductor manufacturing process. Not all of these sources may be easily accounted for in a single control model. Moreover, the control model parameters may be well suited for controlling one type of variation, but inadequate for controlling another.

The present invention is directed to overcoming, or at least reducing the effects of, one or more of the problems set forth above.

SUMMARY OF THE INVENTION

One aspect of the present invention is seen in a method for controlling a process. The method includes determining incoming state information associated with the process. A plurality of control models associated with the process is provided. A confidence metric is determined for each of the control models based on the incoming state information. The one of the plurality of control models having the highest associated confidence metric is selected. A control action for determining at least one parameter in an operating recipe used to implement the process is generated using the selected control model.

Another aspect of the present invention is seen in a system including a process tool and a process controller. The process tool is configured to process a workpiece in accordance with an operating recipe. The process controller is configured to determine incoming state information associated with processing the workpiece, determine a confidence metric for each of a plurality of control models based on the incoming state information, select the one of the plurality of control models having the highest associated confidence metric, and generate a control action for determining at least one parameter in the operating recipe using the selected control model.

BRIEF DESCRIPTION OF THE DRAWINGS

The invention may be understood by reference to the following description taken in conjunction with the accompanying drawings, in which like reference numerals identify like elements, and in which:

FIGS. 2A through 2C are cross-section views of an exemplary feature formed by the processing line of FIG. 1.

Figure 1:
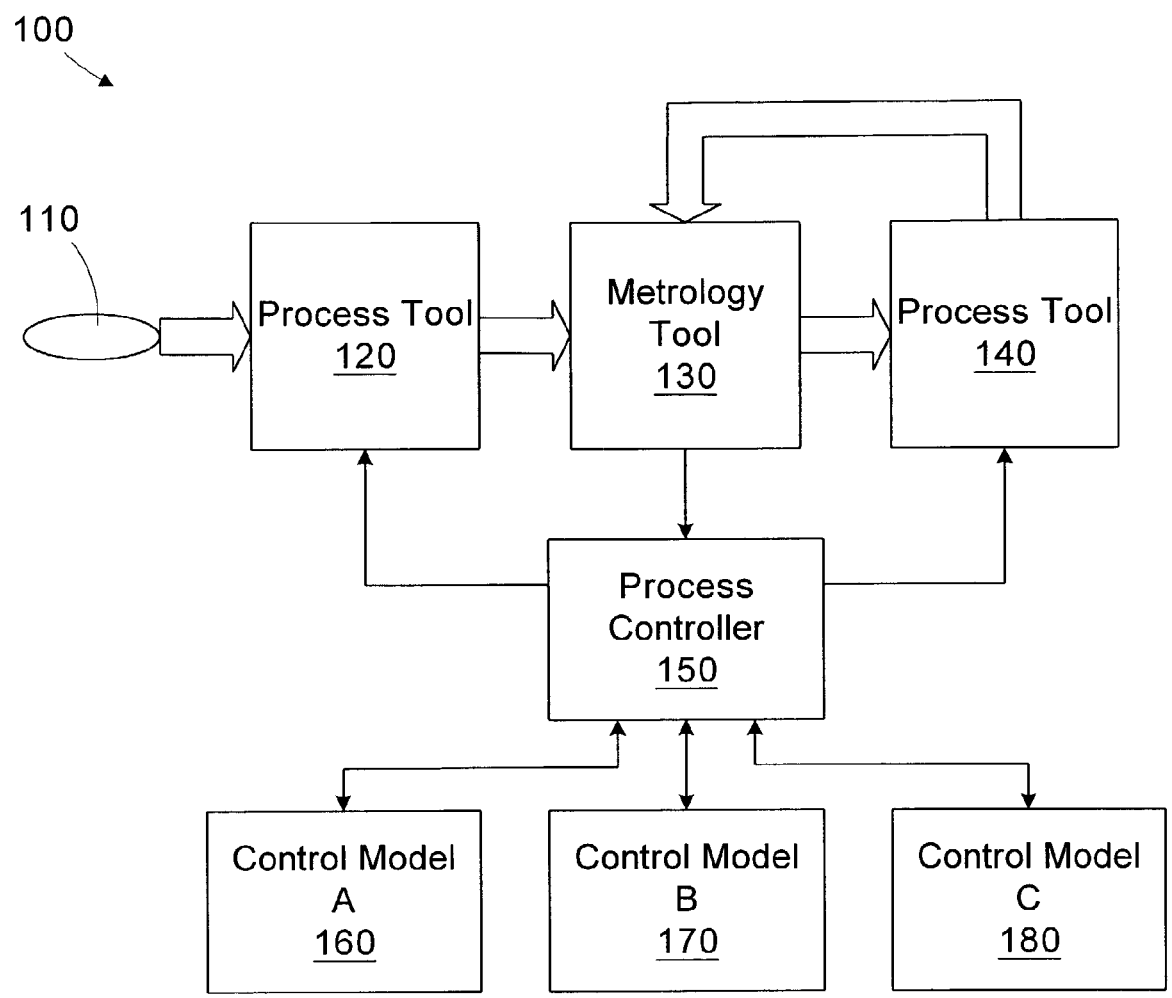
FIG. 1 is a simplified block diagram of a processing line in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a simplified diagram of a portion of an illustrative processing line 100 for processing wafers 110 in accordance with the present invention is provided. The processing line 100 includes a first process tool 120, a metrology tool 130, a second process tool 140, and a process controller 150. The process controller 150 receives data from the metrology tool 130 and adjusts the operating recipe of one or both of the process tools 120, 140 to reduce variations in the characteristics of the processed wafers 110. The particular control actions taken by the process controller 150 depend on the particular processes performed by the process tools 120, 140, and the output characteristic measured by the metrology tool 130.

Although the invention is described as it may be implemented in a semiconductor fabrication facility, the invention is not so limited and may be applied to other manufacturing environments. The techniques described herein may be applied to a variety of workpieces including, but not limited to microprocessors, memory devices, digital signal processors, application specific integrated circuits (ASICs), or other similar devices. The techniques may also be applied to workpieces other than semiconductor devices.

The process controller 150 use a plurality of control models 160, 170, 180 of the process tool 120, 140 being controlled to generate its control action. The control models 160, 170, 180 may be developed empirically using commonly known linear or non-linear techniques. The control models 160, 170, 180 may be relatively simple equation-based models (e.g., linear, exponential, weighted average, etc.) or a more complex model, such as a neural network model, principal component analysis (PCA) model, partial least squares projection to latent structures (PLS) model. The different control models 160, 170, 180 may also be of different types. The specific implementation of the control models 160, 170, 180 may vary depending on the modeling techniques selected and the process being controlled. The process controller 150 maintains confidence metrics associated with each of the control models 160, 170, 180 and selects the control model having the highest confidence metric to generate the current control action. The confidence metric may be based at least in part on the characteristics (i.e., wafer state) of the wafer selected for gathering metrology data to feed the selected control model 160, 170, 180 and/or state information known about the controlled process tool 120, 140 (i.e., tool state). The wafer state or tool state information may be referred to generically as incoming state information. The process controller 150 may use the incoming state information (i.e., wafer, tool, or both) to determine the confidence metric. The incoming state information used to determine the confidence metric may or may not include the metrology data provided to the selected control model 160, 170, 180 for determining the control action. Using the selected control model 160, 170, 180, the process controller 150 may determine operating recipe parameters to reduce variation in the characteristics of the wafers 110 being processed.

In the illustrated embodiment, the process controller 150 is a computer programmed with software to implement the functions described. However, as will be appreciated by those of ordinary skill in the art, a hardware controller designed to implement the particular functions may also be used. Moreover, the functions performed by the process controller 150, as described herein, may be performed by multiple controller devices distributed throughout a system. Additionally, the process controller 150 may be a stand-alone controller, it may be resident on one of the tools 120, 130, 140, or it may be part of a system controlling operations in an integrated circuit manufacturing facility. Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the processing line 100 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The control models 160, 170, 180 are configured differently such that they are specially adapted for different ranges of wafer characteristics. Each control model 160, 170, 180 typically, includes one or more tuning parameters that are used to generate the control action. The tuning parameters are typically different for each of the control models 160, 170, 180. Exemplary tuning parameters include gain factors that are applied to feedback or feedforward metrology data or weight factors that are applied to current and historical metrology data for data smoothing techniques. The following discussion illustrates exemplary control equations to show various tuning parameters.

In one illustrative example, the process tool 120 is an etch tool and the metrology tool 130 is configured to measure the depth of a trench formed by the etching process. A feedback control equation employed by the process controller 150 in accordance with the control model 160 for determining an etch time, $T_E$, is:

$$T_E = T_B + k_1 * (\text{Target Trench Depth} - \text{Measured Trench Depth}), \quad (1)$$

where $T_B$ is a base etch time corresponding to a default etch time value, $k_1$ is a tuning parameter, and the difference between the target depth of the trench and the measured depth of the trench reflects an error value. The gain constant, $k_1$, represents how aggressively the process controller 150 reacts to errors in the trench depth. Of course, feedback control equations may be more complicated and may include more than one tuning parameter. For example, in a classical process sense, a feedback control equation may include a proportional factor (as shown), an integral factor, and a derivative factor.

Figure 2C:
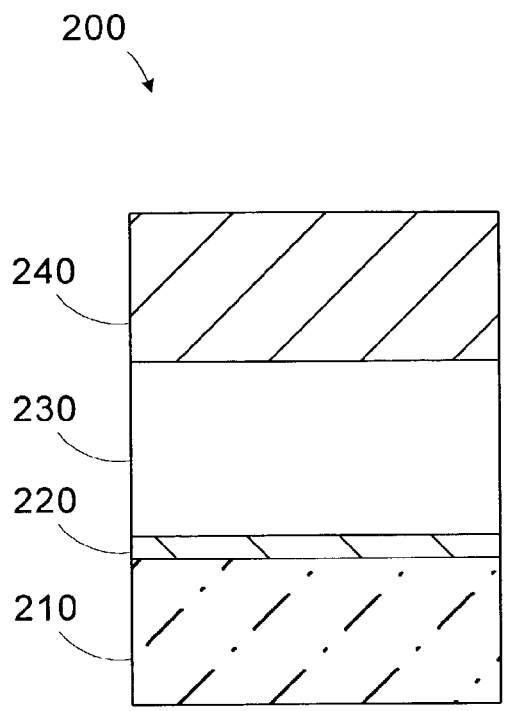
Figure 2C:
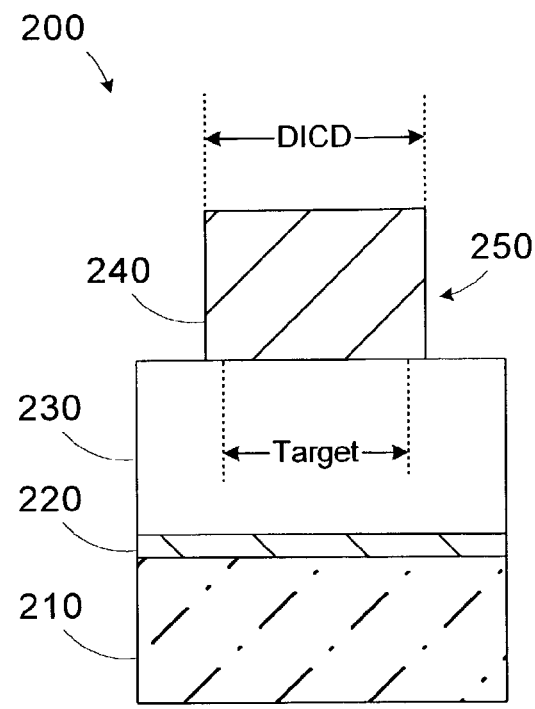
Figure 2C:
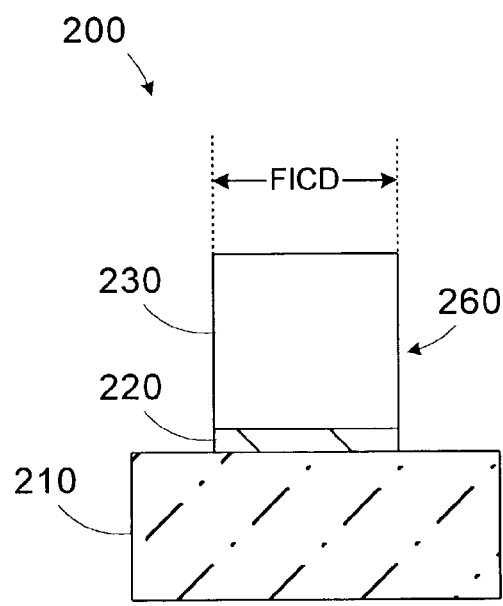

In another illustrative example, the process tool 120 may be a photolithography tool adapted to form a photoresist pattern over a process layer (e.g., a polysilicon layer used to form a transistor gate electrode), and the process tool 140 may be an etch tool. As shown in FIG. 2A, an exemplary semiconductor device 200 includes a substrate 210 on which a gate insulation layer 220 is formed. A polysilicon layer 230 is formed over the substrate 210, and a photoresist layer 240 is formed over the polysilicon layer 230. An antireflective coating (ARC) layer (not shown) may also be formed above the polysilicon layer 230. As seen in FIG. 2B, the photoresist layer 240 is patterned to define a photoresist feature, such as a line 250. The width of the photoresist line 250 is measured prior to etching to generate a develop inspect critical dimension (DICD) measurement. As part of the etching process used to form the gate electrodes structure, an initial etch process is performed on the photoresist line 250 by the process tool 140 to reduce the width of the photoresist line 250 to match a target line width. As shown in FIG. 2C, the photoresist line 250 is used as a mask for a subsequent etch process performed by the process tool 140 to form a transistor gate electrode stack 260, and the photoresist line 250 is removed. Subsequently, the transistor gate electrode stack 276 is measured (e.g., routed back to the metrology tool 130 or measured by a different metrology tool (not shown)) to generate a final inspection critical dimension (FICD). An exemplary technique for performing a gate trim etch is described in greater detail in U.S. Pat. No. 6,110,785, entitled "FORMULATION OF HIGH PERFORMANCE TRANSISTORS USING GATE TRIM ETCH PROCESS," and incorporated herein by reference in its entirety.

The DICD measurement is used by the process controller 150 as feedforward information for determining an etch time. The FICD measurement taken after the etch process may be used to update the state of the control model 160. The control model 160 employed by the process controller 150 may use the following state equation:

$$\text{State} = \text{FICD} - \text{gamma} * \text{DICD} - \text{alpha} * \text{TrimTime}, \quad (2)$$

where gamma is a tuning parameter applied to the feedforward DICD measurement and alpha represents the historical etch rate of the process tool 140. The DICD of the photoresist features on an incoming wafer is measured and the state equation is solved by the process controller 150 for the trim time to apply to the incoming wafer. Following the etch process, the FICD value is determined and substituted into Equation 2, and it is solved for the current State value. The FICD measurement may also be used to update the alpha parameter.

To reduce the effects of noise in the control equation, a smoothing technique may be applied to the updating of the State parameter. For example, an exponentially weighted moving average technique may be used in accordance with the following equation:

$$Z_i \lambda \cdot X_i + (1 - \lambda) \cdot Z_{i-1} \quad i = 1, 2, \ldots, n \quad (3)$$

where $Z_1$ is the ith EWMA, $X_1$ is the ith observation, $Z_0$ is the average from the historical data, and $0 < \lambda < 1$. The EWMA is applied to the State parameter above in Equation 2. The $\lambda$ parameter is a tuning parameter that determines the relative contribution of the current observation versus that of the previous average. If the confidence in the accuracy of the current measurement is relatively high, λ is set closer to one.

The preceding examples are provided to illustrate various tuning parameters that may be used in the control models 160, 170, 180. However, the application of the present invention is not limited to these particular tuning parameters. Other control schemes may employ different models with different associated tuning parameters, and the present invention applies to these implementations as well.

Referring back to FIG. 1, the process controller 150 determines a confidence metric for each of the control models 160, 170, 180 prior to selecting one of them for generating a control action. The control action may be a feedback control action generated using metrology data collected after processing of a wafer 110 and/or a feedforward control action generated using metrology data collected prior to processing the wafer 110.

There are various ways to derive confidence metric based on the incoming state information. One technique involves using knowledge of the process being performed by the controlled process tool 120, 140 to define a relationship when building the control model 160, 170, 180 that describes its validity over certain ranges of incoming parameters (wafer measurements, tool state, etc). This relationship can then be evaluated at any time based on the current values of those incoming parameters. For example, the confidence metric may be generated based on whether the incoming state information is within a predefined acceptable range for the control model 160, 170, 180. In another embodiment, the confidence metric may be based on the difference between the incoming state information and a predetermined center point assigned to each of the control models 160, 170, 180. The confidence metric would decrease as the distance between the incoming parameter and the center point increased.

In another embodiment, the confidence metric may be determined by performing a statistical analysis of the parameters used in the model and looking at historical data to compare the performance of the different models. Using the historical approach, the performance (e.g., error measurements) of each control model 160, 170, 180 may be determined by matching the incoming state characteristics to the historical state characteristics associated with prior processing runs and evaluating the performance of each model 160, 170, 180 for similarly situated processing runs.

Figure 3:
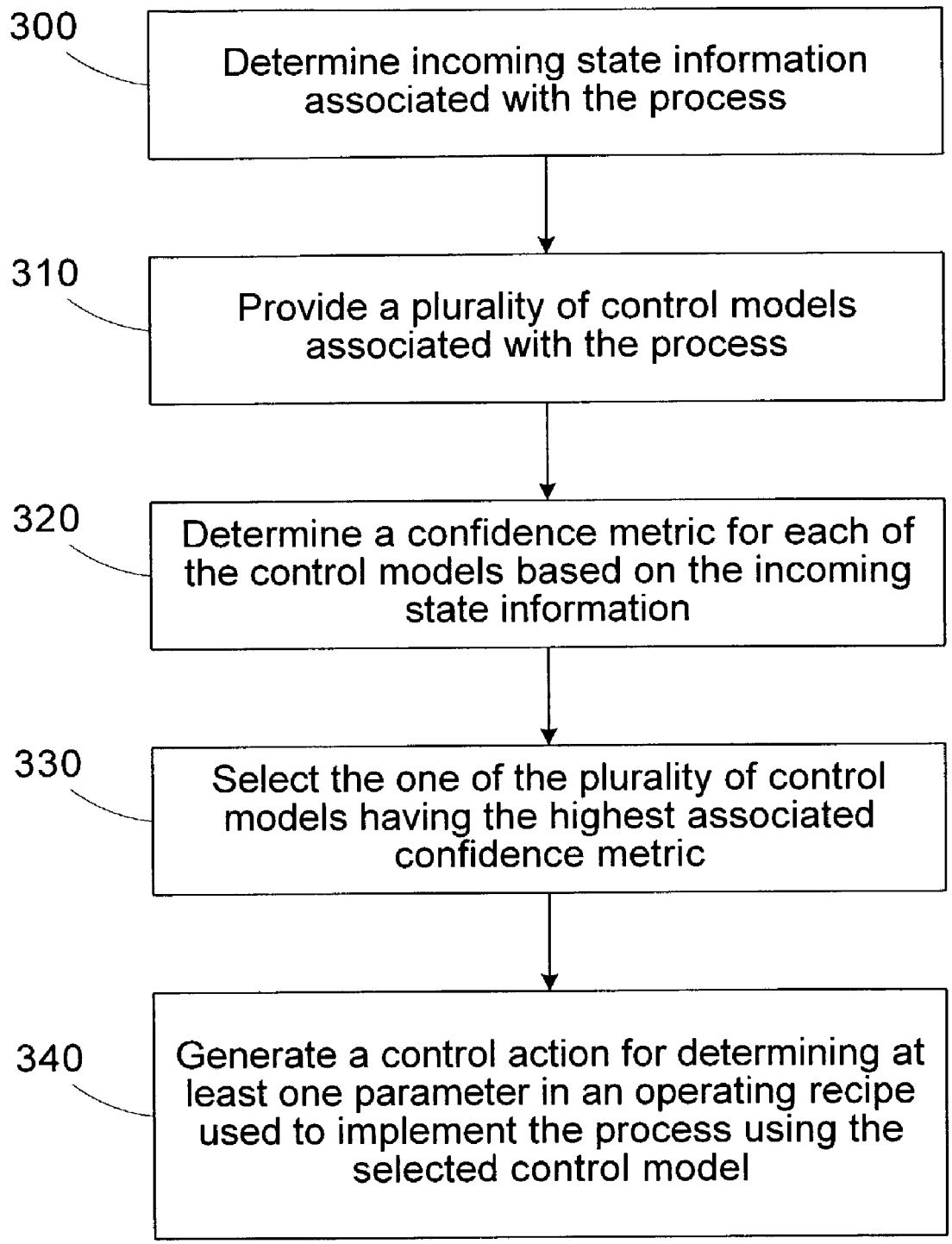
FIG. 3 is a simplified flow diagram of a process for controlling a process tool using competing control models in accordance with another implementation of the present invention.

Turning now to FIG. 3, a simplified flow diagram of a process for controlling a process tool using competing control models in accordance with another implementation of the present invention is provided. In block 300, incoming state information associated with the process is determined. The incoming state information may include wafer state and/or tool state information. In block 310, a plurality of control models associated with the process are provided. In block 320, a confidence metric for each of the control models is determined based on the incoming state information. In block 330, the one of the plurality of control models having the highest associated confidence metric is selected. In block 340, a control action for determining at least one parameter in an operating recipe used to implement the process is generated using the selected control model.

Using the confidence metrics of the competing control models 160, 170, 180 to select the model best suited for generating the control action, increases the efficacy of the process controller 150. Improving the performance of the process controller 150 reduces variation in the manufactured products, thus increasing the profitability and efficiency of the processing line.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for controlling a process, comprising:
   determining incoming state information associated with the process;
   providing a plurality of control models associated with the process;
   determining a confidence metric for each of the control models based on the incoming state information;
   selecting the one of the plurality of control models having the highest associated confidence metric; and
   generating a control action for determining at least one parameter in an operating recipe used to implement the process using the selected control model.

2. The method of claim 1, wherein generating the control action comprises generating a feedback control action.

3. The method of claim 1, wherein generating the control action comprises generating a feedforward control action.

4. The method of claim 1, wherein determining the incoming state information further comprises determining a characteristic of a current workpiece processed using the process.

5. The method of claim 4, further comprising processing the current workpiece in accordance with the generated parameter of the operating recipe.

6. The method of claim 4, further comprising processing a subsequent workpiece in accordance with the generated parameter of the operating recipe.

7. The method of claim 1, wherein determining the incoming state information further comprises determining a characteristic of a process tool used to implement the process.

8. The method of claim 1, wherein determining the confidence metric for each of the control models further comprises:
   assigning a range to each of the control models; and
   generating the confidence metric for each control model based on the whether the incoming state information is encompassed by the associated range.

9. The method of claim 8, wherein selecting the one of the plurality of control models having the highest associated confidence metric further comprises selecting the one of the plurality of control models having an associated range encompassing the incoming state information.

10. The method of claim 1, wherein determining the confidence metric for each of the control models further comprises:
   analyzing historical data collected for the process to identify previous process runs having state information falling within a range about the incoming state information;
   determining the performance of each of the control models based on the historical data; and
   generating the confidence metric for each of the control modes based on the determined performance.

11. The method of claim 1, wherein determining the confidence metric for each of the control models further comprises:

assigning a center point to each of the control models; and generating the confidence metric for each control model based on a comparison between the incoming state information and the center point.

12. A system, comprising:

a process tool configured to process a workpiece in accordance with an operating recipe; and a process controller configured to determine incoming state information associated with processing the workpiece, determine a confidence metric for each of a plurality of control models based on the incoming state information, select the one of the plurality of control models having the highest associated confidence metric, and generate a control action for determining at least one parameter in the operating recipe using the selected control model.

13. The system of claim 12, wherein the control action comprises a feedback control action.

14. The system of claim 12, wherein the control action comprises a feedforward control action.

15. The system of claim 12, wherein the incoming state information further comprises a characteristic of a current workpiece processed by the process tool.

16. The system of claim 15, wherein the process tool is further configured to process the current workpiece in accordance with the generated parameter of the operating recipe.

17. The system of claim 15, wherein the process tool is further configured to process a subsequent workpiece in accordance with the generated parameter of the operating recipe.

18. The system of claim 12, wherein the incoming state information further comprises a characteristic of a process tool used to implement the process.

19. The system of claim 12, wherein the process controller is further configured to assign a range to each of the control models and generate the confidence metric for each control model based on the whether the incoming state information is encompassed by the associated range.

20. The system of claim 19, wherein the process controller is further configured to select the one of the plurality of control models having an associated range encompassing the incoming state information.

21. The system of claim 12, wherein the process controller is further configured to analyze historical data collected for the process to identify previous process runs having state information falling within a range about the incoming state information, determine the performance of each of the control models based on the historical data, and generate the confidence metric for each of the control modes based on the determined performance.

22. The system of claim 12, wherein the process controller is further configured to assign a center point to each of the control models and generate the confidence metric for each control model based on a comparison between the incoming state information and the center point.

23. A system, comprising:

means for determining incoming state information associated with a process;

means for providing a plurality of control models associated with the process;

means for determining a confidence metric for each of the control models based on the incoming state information;

means for selecting the one of the plurality of control models having the highest associated confidence metric; and means for generating a control action for determining at least one parameter in an operating recipe used to implement the process using the selected control model.

* * * * *